INVENTOR.
Paul A. Zamarra
BY
ATTORNEY

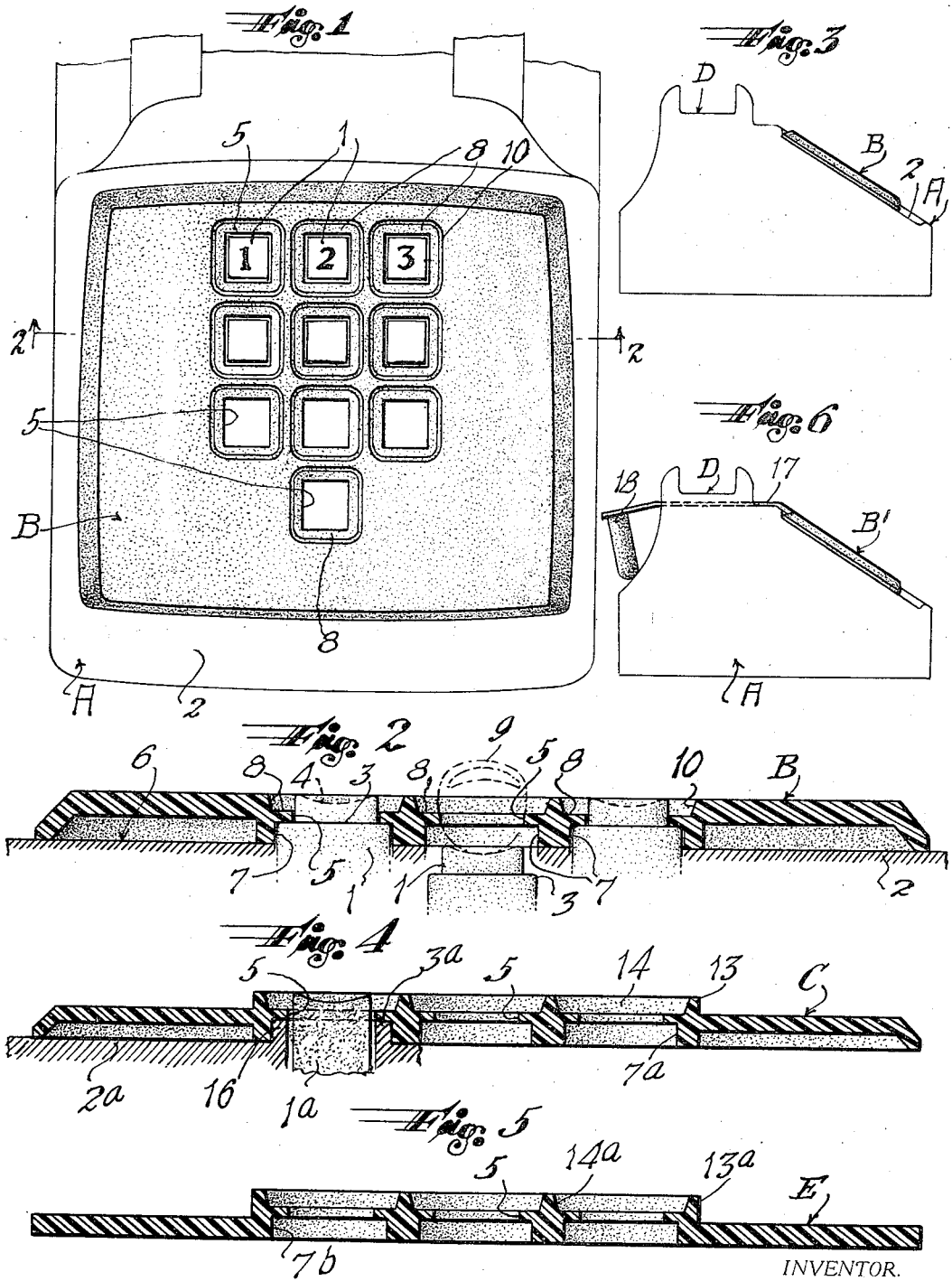

United States Patent Office 3,491,221
Patented Jan. 20, 1970

3,491,221
APPARATUS CASING WITH SHIELD PLATE FOR PROJECTING PUSHBUTTONS
Paul A. Zamarra, Lake Road, Far Hills, N.J. 07931
Filed June 12, 1968, Ser. No. 736,332
Int. Cl. H01h 9/02; H04m 1/02
U.S. Cl. 200—168                    4 Claims

ABSTRACT OF THE DISCLOSURE

A shield plate has a plurality of openings therethrough each of a size and shape to encircle the portion of one of a plurality of closely spaced apart pushbuttons that project above a planar surface of a casing wall. The plate is set on said surface with its top surface approximately flush with the tops of the pushbuttons, and the plate has a recess at each end of each opening, that is, at the bottom side and at the top side of the plate, to receive respectively a shoulder on the pushbutton or on the casing and an operator's finger when the button is pushed, so as to hold the plate and prevent accidental slipping of the finger from one button to an adjacent button.

BACKGROUND OF THE INVENTION

The invention relates to the protection of push buttons such as are used in modern telephones, switch casings and other devices having one or more pushbuttons projecting from a casing wall.

One type of protection comprises a flange or rib on the surface of the casing wall surrounding the portion of the pushbutton that projects from the wall to reduce the possibility of unintentional actuation of the button by pressure against the wall, for example, such as might occur upon the leaning against the wall of a workman or some extraneous object. Such flanges generally have been formed integrally with or rigidly secured to the casing wall, and the provision of such flanges complicates and adds to the cost of manufacture of such casing walls.

Some casings of machines and devices have a plurality of pushbuttons projecting above a planar surface in closely spaced apart relation, for example the casings of telephones which are dialed by push buttons, and nothing is provided to prevent accidental operation of the push buttons, for example the sliding of the operator's finger from one push button to an adjacent pushbutton.

SUMMARY OF THE INVENTION

One object of the present invention is to provide a novel and improved means for preventing the accidental operation of pushbuttons, especially where the pushbuttons project from a planar surface in closely spaced apart relation to each other, for example in the modern telephones which are "dialed" by pushbuttons.

The invention contemplates a shield plate to set on a planar surface, such as the surface of a desk telephone casing, and formed with an opening to encircle the projecting portion of each pushbutton, the plate having a recess at each end of each opening so that the recess at one end of the opening at the bottom side of the plate fits over a shoulder on the pushbutton or on the casing, while the recess at the other end of the opening at the top side of the plate is adapted to receive an operator's finger when the button is pushed. The engagement of the plate with the shoulders on the push buttons or on the casing holds the plate in position on the casing wall; and when an operator's finger pushes a button, the finger enters the corresponding recess around the button at the top side of the plate so as to prevent accidental slipping of the finger from that button to an adjacent button.

A BRIEF DESCRIPTION OF THE DRAWINGS

For the purpose of illustrating the principles of the invention, several embodiments of the invention are illustrated in the accompanying drawings in which:

FIGURE 1 is a top plan view of a shield plate set in position on the top wall of a desk telephone set, portions of which are broken away;

FIGURE 2 is an enlarged fragmentary vertical sectional view approximately on the plane of the line 2—2 of FIGURE 1;

FIGURE 3 is a side elevational view on a reduced scale of the telephone set and shield plate shown in FIGURE 1;

FIGURE 4 is a view similar to FIGURE 2 showing a modification of the invention;

FIGURE 5 is a similar view showing another modified form of the shield plate;

FIGURE 6 is a view similar to FIGURE 3 showing a combination of the shield plate and a pencil holder;

A BRIEF DESCRIPTION OF THE PREFERRED EMBODIMENTS OF THE INVENTION

Figure 7:
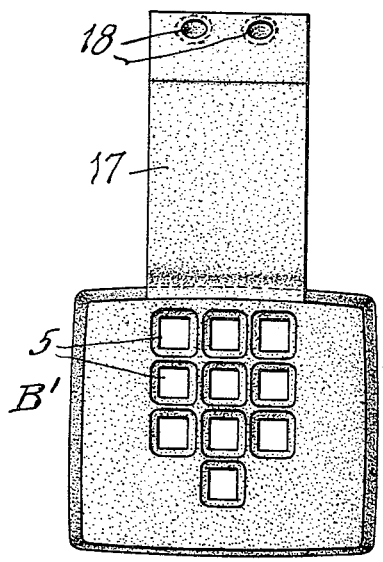
FIGURE 7 is an enlarged top plan view of the combination shield plate and pencil holder shown in FIGURE 6.

While the invention may be utilized in connection with different devices and casings having projecting pushbuttons, it is shown with a known modern type of desk telephone set wherein the telephone stations to be called are selected by push buttons instead of by the more commonly known dial.

The push buttons may be of different constructions, but as here shown in FIGURES 1 and 2, the pushbuttons 1 are mounted in known manner in a wall 2 of the casing A of the telephone set. The buttons are shown as square in end view and have shoulders 3 spaced inwardly from the usually concave end surfaces 4 against which the operator's fingers are pressed for manipulating the buttons.

The shield plate B is shown as formed of one molded piece of synthetic plastic material having a plurality of openings 5 therethrough each of which is of a size and shape to encircle the portion of one of the buttons that projects beyond the shoulder 3.

The plate is adapted to set on planar surface 6 of the casing wall 2 with its top surface approximately flush with tops of the pushbuttons, which is best shown in FIGURE 2. At the bottom side of the plate there is a recess 7 around each of the openings 5, and at the top side of the plate is a recess 8 surrounding the portion of each button that projects through the corresponding opening. The recesses 7 have a sliding fit with the portions of the pushbuttons 1 below the shoulders 3, and the shoulders 3 abut the end walls of said recesses.

With this construction, the pushbuttons disposed in the recesses 7 hold the plate B against sliding on the planar surface, and in the present construction the action of gravity holds the plate in contact with the planar surface 6 of the casing wall.

When a pushbutton is operated by the finger of an operator which is indicated by broken lines 9, the finger enters the corresponding recess 8 and the side walls of the recess indicated by the reference character 10 prevent the finger from accidentally slipping off the button and into contact with one of the adjacent buttons. It will be understood that the illustration in FIGURE 2 is exaggerated for the purpose of clarity of disclosure of the invention. In this form of the invention the shield plate has a perimetral downturned flange 11. The free edge of the flange and the ends of the portions 12 between the recesses 7 are preferably disposed in a common plane to provide a firm setting of the plate on the supporting surface 6.

In FIGURE 4 the height of the flange 11a has been reduced and the top side of the plate C has portions 13 projecting upwardly therefrom and providing the recesses 14 which correspond to the recesses 8. The portions 12a surrounding the recesses 7a at the bottom side of the plate are correspondingly reduced in height.

In the plate shown in FIGURE 5, the perimetral flange has been omitted entirely and the portions 13a corresponding to the portions 13 are increased in height.

In some constructions, the pushbutton does not have a shoulder, for example as indicated at 1a in FIGURE 4, a shoulder 3a being formed by a part 16 made integral with or secured to the casing wall 2a.

The invention also contemplates the combination with the shield plate of article holders such as a pencil holder shown in FIGURES 6 and 7 which comprise a strap-like extension 17 from one edge of the shield plate B' which has at its extremity a plurality of socket members 18. The strap-like extension 17 is adapted to rest on the portion of the casing of the telephone set immediately beneath the rest D for the combined transmitter and receiver.

Figure 8:
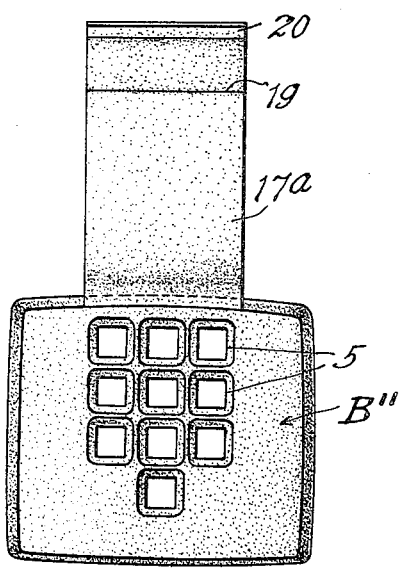
FIGURE 8 is a view similar to FIGURE 7 showing a sheet or card holder combined with the shield plate.
Figure 9:
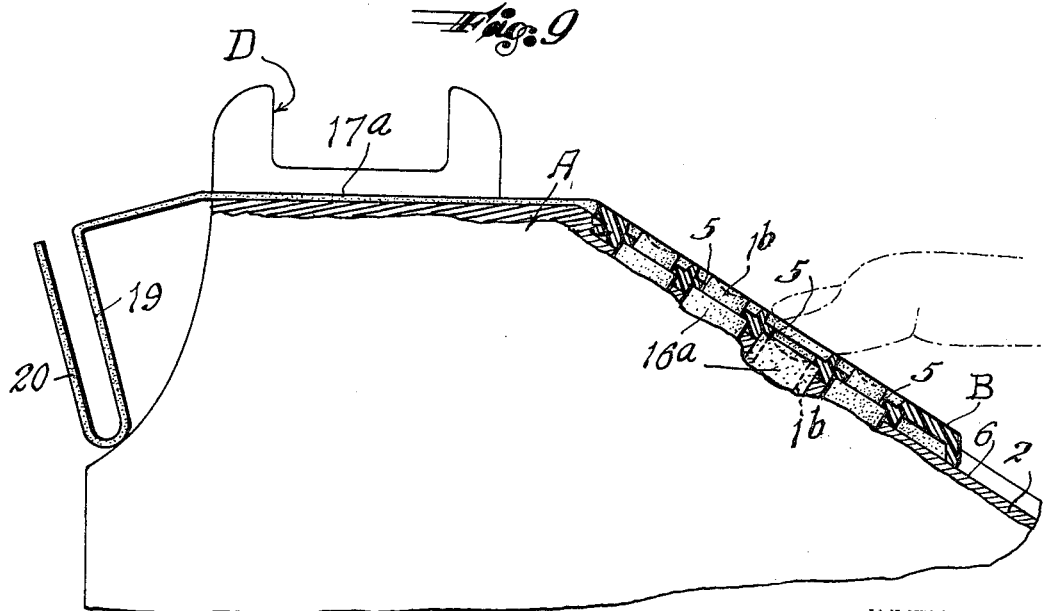
FIGURE 9 is an enlarged composite vertical sectional view and side elevation of the shield plate and the card holder shown in FIGURE 8 mounted on a desk telephone set, portions of which are broken away and the receiver and transmitter portion of which is omitted.

In FIGURES 8 and 9 another modification is shown wherein the strap-like extension 17a from the shield plate B" has its outer end portion bent downwardly at 19 and then returned upwardly at 20 to provide a U-shaped pocket for cards, pads or the like. In FIGURE 9 the combination plate and pocket is shown applied to the casing of the telephone set, and portions of the plate E" are broken away to illustrate the pushbuttons 1b and the operation of one thereof and the finger of an operator which is shown in broken lines.

It will be understood that the now preferred embodiments of the invention have been illustrated and described for the purpose of explaining the principles of the invention and that in these embodiments the distance between the general planes of the top side and the bottom side of the plate, in other words, the overall thickness of the plates, is approximately equal to the length of the projecting portions of the pushbuttons.

However, modifications and changes in the construction of the shield plate and use thereof on different types of instrument or machine casings, may be effected without departing from the spirit or scope of the invention.

I claim:

1. The combination of an apparatus casing having a wall with a planar surface and at least one pushbutton mounted in the wall with a portion projecting beyond said planar surface, and a shield plate having a bottom site set on said planar surface with its top side approximately flush with the end of said projected portion of the push button, said shield plate having an opening through which said push button projects and said plate also having a recess at the end of said opening at the top side of the shield plate adapted to receive the operator's finger when the button is pushed and providing a wall encircling the button in spaced relation thereto to prevent slipping of the finger off the button.

2. The combination of an apparatus casing having a wall with a planar surface and at least one pushbutton mounted in the wall with a portion projecting beyond said planar surface, one of said pushbutton and said wall having a shoulder around the pushbutton, and a shield plate having a bottom side set on said planar surface with its top side approximately flush with the end of said projecting portion of the pushbutton, said shield plate having an opening through which said pushbutton projects and said plate also having a recess at each end of said opening at the respective bottom side and top side of the plate, the recess at the bottom side of the plate having a slip fit over said shoulder and the recess at the top side of the plate being adapted to receive the operator's finger when the button is pushed and providing a wall encircling the button in spaced relation thereto, to prevent accidental slipping of the finger off the button.

3. For use in protecting pushbuttons which project from the planar surface of a wall of a casing, a shield plate having a top side and a bottom side the distance between the general planes of which is approximately equal to the length of the projecting portions of the pushbuttons, said bottom side being adapted to set on said planar surface and said plate having an opening therethrough for the projecting portion of each pushbutton and also having a recess in its top side around the end of each opening to shield the corresponding button against unintended application of pressure and into which an operator's finger will be pressed during the pushing of the corresponding pushbutton, said recess having a wall encircling the button in spaced relation thereto, to prevent slipping of the finger from one pushbutton to an adjacent pushbutton.

4. For use in protecting pushbuttons which project from the planar surface of a wall of a casing, the shield plate as defined in claim 3 having a recess in its bottom side around the end of each opening adapted to fit over a shoulder on said casing wall.

References Cited

UNITED STATES PATENTS

| | | |
|---|---|---|
| 2,769,882 | 11/1956 | Vitus et al. |
| 2,773,150 | 12/1956 | Wintle. |
| 3,233,071 | 2/1966 | Buzzell. |
| 3,345,769 | 10/1967 | Nathan _____ 179—178 |
| 3,372,246 | 3/1968 | Knuepfer. |

HERMAN O. JONES, Primary Examiner

U.S. Cl. X.R.

179—178